United States Patent
Bunk et al.

(10) Patent No.: US 7,402,952 B2
(45) Date of Patent: Jul. 22, 2008

(54) INCANDESCENT LAMP WITH A CARBON CYCLE AND A HALOGEN CYCLE

(75) Inventors: Axel Bunk, Munich (DE); Matthias Damm, Gaimersheim (DE); Georg Rosenbauer, Wassertrudingen (DE); Joachim Werner, Petershausen (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 469 days.

(21) Appl. No.: 10/526,312

(22) PCT Filed: Nov. 19, 2004

(86) PCT No.: PCT/DE2004/002562

§ 371 (c)(1),
(2), (4) Date: Mar. 2, 2005

(87) PCT Pub. No.: WO2005/055274

PCT Pub. Date: Jun. 16, 2005

(65) Prior Publication Data

US 2006/0103305 A1    May 18, 2006

(30) Foreign Application Priority Data

Dec. 1, 2003 (DE) ................. 103 56 651
Dec. 11, 2003 (DE) ................. 103 58 262

(51) Int. Cl.
*H01K 1/50* (2006.01)
(52) U.S. Cl. ............ 313/579; 313/315; 313/578
(58) Field of Classification Search ............... 313/579
See application file for complete search history.

(56) References Cited

U.S. PATENT DOCUMENTS

| 1,854,970 A | * | 4/1932 | Agte ..................... 313/311 |
| 2,030,695 A | | 2/1936 | Erber |
| 2,596,469 A | | 5/1952 | Cooper, Jr. |
| 2,928,977 A | | 3/1960 | Roth et al. |
| 3,022,436 A | | 2/1962 | Cooper, Jr. |

(Continued)

FOREIGN PATENT DOCUMENTS

| DE | 536 749 | 5/1930 |
| DE | 632 332 | 5/1932 |
| GB | 957597 | 11/1961 |

OTHER PUBLICATIONS

Schafer,"Chemishe Transportreacktionen" Verlaag Chemie, 1962: s. 16-17, 32-43, 140-143.

(Continued)

*Primary Examiner*—Karabi Guharay
*Assistant Examiner*—Britt Hanley
(74) *Attorney, Agent, or Firm*—William E. Meyer

(57) ABSTRACT

The incandescent lamp, which uses a carbon cycle process, is equipped with a luminous body which, together with a fill, is introduced in a vacuum-tight manner into a bulb, the luminous body including a metal carbide, the melting point of which is above that of tungsten. The distance between the luminous body and the wall of the bulb is less than 18 mm, with a first cycle process, which is attributed to the carbon, being effected by the use of carbon and hydrogen as fill additive, and a second cycle process, which is attributed to the metal, being effected by the use of halogen.

18 Claims, 2 Drawing Sheets

U.S. PATENT DOCUMENTS

| | | |
|---|---|---|
| 3,022,438 A | 2/1962 | Cooper, Jr. |
| 3,022,439 A | 2/1962 | Cooper, Jr. et al. |
| 3,237,284 A | 3/1966 | Bird |
| 3,277,330 A | 10/1966 | Cooper, Jr. |
| 3,405,328 A | 10/1968 | Johansen et al. |
| 4,463,277 A * | 7/1984 | DeCaro .................. 313/25 |
| 4,777,404 A * | 10/1988 | Kiesel et al. ............ 313/579 |
| 5,886,466 A * | 3/1999 | Bell et al. ............... 313/579 |

OTHER PUBLICATIONS

"Optische Strahlungsquellen" Kapitel 4, "Halogengluhlampen", Lexia Verlag, 1977 s. 91-133.

Becker, Ewest,"Die Physikalischen und Strahlungstechischen Eigenschaften des Tantalkarbids", Zeitschrift fur Technische Physik, Nr. 5, s 148-150, Nr. 6 s. 216-220 (1930).

Von L. Eberle, Die Atomwirtschaft Mai 1964c 220-226.

J.A. Coffmann, G.M. Kibler, T.R. Riethof, A.A. Watts: WADD-TR-60-646 Part 1 (1960).

\* cited by examiner

INCANDESCENT LAMP WITH A CARBON CYCLE AND A HALOGEN CYCLE

TECHNICAL FIELD

The invention is based on an incandescent lamp with carbon cycle process in accordance with the preamble of claim 1. It deals in particular with halogen incandescent lamps which have a luminous body made of TaC or the luminous body of which contains TaC as a constituent.

PRIOR ART

Many documents have already disclosed an incandescent lamp with carbon cycle process using a halogen (carbon-halogen cycle process). Here, the halogen serves to prevent carbon from being deposited on the bulb wall. However, it has proven more efficient to use a carbon-hydrogen cycle process in which the deposition of carbon on the bulb wall is avoided by the formation of hydrocarbons. A carbon-hydrogen cycle process has the advantage over a carbon-halogen cycle process that in this case, unlike with the situation for carbon-halogen cycle processes, frame parts (holders) in the lamp, which are at a relatively low temperature, are not attacked.

Chemical transport reactions are distinguished by the fact that a solid substance, referred to below as <s> for short, or a liquid substance, referred to below as <f> for short, reacts at a given temperature T1 to form only gaseous products, referred to below as <g> for short. Then, the gaseous reaction product is transported to a location at a different temperature T2, where it decomposes again so as to deposit a solid or liquid phase. For detailed investigations into chemical transport reactions, cf. for example H. Schäfer, "Chemische Transportreaktionen" [Chemical Transport Reactions], Verlag Chemie, 1962, which describes in detail on pages 16 to 17, 32 to 43 and 140 to 143 that chemical transport reactions can be quantified on the basis of a number of rules, of which the most important are:

[A] a reaction can only transport if no solid phase is formed one side of the reaction equation: $A(s)+B(g)=C(g)$.

[B] a reaction with an extreme equilibrium position does not produce any measurable solid phase transfer. When selecting transporting systems, a primary objective is that the equilibrium position should not be extreme.

[C] the sign of $\Delta H_R$, the enthalpy of reaction, determines the transport direction. Exothermic reactions transport from low temperature to high temperature, whereas endothermic reactions transport from high temperature to low temperature. This follows from what is known as the van 't Hoff equation, which describes the shift in the chemical equilibrium in the event of temperature changes.

Further rules make statements concerning the influence of the reaction entropy. The transport of the gaseous substances may be effected by various mechanisms. The most important are diffusion in the concentration gradient, thermodiffusion, thermal convection and forced convection (external imposed flow). Depending on the reaction system under consideration, either the rates of the chemical reactions or the transport via the gas phase can be the determining factor for the reaction rate for the overall process.

An example which may be considered is the reaction between tantalum and iodine:

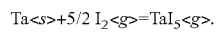

$$Ta<s>+5/2\, I_2<g>=TaI_5<g>.$$

At room temperature (298 K) or at a temperature of 1300 K, this gives for the enthalpy of reaction $\Delta H_R(298K)=-274.3$ kJ/mol or $\Delta H_R(1300K)=-263.8$ kJ/mol. Therefore, on account of the sign of the enthalpy of reaction being negative over the entire temperature range, the tantalum is transported from locations at a low temperature to locations at a higher temperature.

One example of the use of the chemical transport reaction described above is the known purification of metals using the van Arkel-de Boer process. In this process, by way of example, tantalum is converted into gaseous tantalum iodide by reaction with iodine at 500° C., the gaseous tantalum iodide is transported to hotter locations as a result of a flow. At temperatures above approx. 1050° C., the tantalum iodide decomposes again, depositing pure tantalum. Impurities, such as for example tantalum oxide, have a relatively low volatility and remain behind at the starting point. The metals Ni, Cu, Fe, Cr, Si, Ti, Hf, Th, V, Nb and U can be purified in a similar way.

Chemical transport reactions of this type are also used in lamp technology, e.g. in halogen incandescent lamps, in order to transport tungsten which has been evaporated from the filament back to the filament. In this tungsten-halogen cycle process, as it is known, tungsten which has been evaporated from the filament is reacted at the relatively low temperatures near to the bulb wall to form tungsten halides and/or tungsten oxyhalides (if oxygen is present), which are transported back to the filament. At the high temperatures near to the filament, the tungsten halides and tungsten oxyhalides decompose again. The tungsten released is accumulated onto the filament. It is important in this context that the vapor pressure of the tungsten halides or tungsten oxyhalides is sufficiently high at the relatively low temperatures prevailing in the vicinity of the bulb wall, which are generally in the range between 200° C. and 600° C., to prevent the solid compounds from being deposited there. If iodine or bromine is used as active halogen addition, this is only possible if at least traces of oxygen are present at the same time, since the vapor pressures of the pure halides are too low or these halides are not formed at all in the gas phase. This is in particular because the pure halides are more easily reduced by the hydrogen introduced together with the halogenated hydrocarbon compounds than the oxyhalides. Bulb walls which have already been partially blackened can have the blackening removed again by means of a transport reaction of this type. Apart from when fluorine is used as halogen, halogen cycle processes in halogen lamps are not regenerative, i.e. the tungsten is not deposited again at the hottest location, where it has preferentially evaporated, but rather at locations which are at other temperatures.

There is extensive literature describing the halogen cycle process in halogen lamps. For properties of various halogen cycle processes in halogen lamps, cf. for example "Optische Strahlungsquellen" [Optical radiation sources], Chapter 4 "Halogenglühlampen" [Halogen incandescent lamps] Lexika Verlag, 1977 and the literature cited therein.

One known option for increasing the efficiency of incandescent lamps is the use of incandescent bodies formed from high-melting ceramics, such as tantalum carbide. Cf. in this respect, by way of example, Becker, Ewest: "Die physikalischen und strahlungstechnischen Eigenschaften des Tantalkarbids" [The physical and radiation properties of tantalum carbide], Zeitschrift für technische Physik, No. 5, pp. 148-150 and No. 6, pp. 216-220 (1930)). The increase in the efficiency results from the fact that the incandescent body made from metal carbide, on account of the much higher melting points compared to the pure metals, can be operated at a higher temperature: the melting point of TaC is 3880° C., compared to 3410° C. for tungsten. Moreover, compared to tungsten, the emission coefficient of the carbides is greater in the visible region than in the IR. In particular tantalum carbide is a better "selective radiator" than tungsten.

One problem with operating tantalum carbide luminous bodies at high temperatures is the decarburization; this leads to the formation of sub-carbides with a higher resistivity and a lower melting point and therefore to rapid destruction of the luminous body. A number of approaches have been adopted in the literature with a view to solving this problem.

One option mentioned in U.S. Pat. No. 3,405,328 consists in dissolving the carbon in excess in the tantalum carbide luminous body. The carbon which evaporates outward from the luminous body and is deposited on the bulb wall is then replaced from the interior through diffusion.

A further option is to add carbon and hydrogen to the filling gas, cf. for example U.S. Pat. No. 2,596,469. In this case a carbon cycle process is formed in the lamp. The carbon, which evaporates at high temperatures, reacts with hydrogen at lower temperatures to form hydrocarbons, which are transported back to the filament through convection and/or diffusion where they are again decomposed. The carbon formed is once again accumulated at the filament. For a carbon cycle process to function, it is generally necessary to use an excess of hydrogen in order to avoid the deposition of carbon (in the form of soot) in the lamp vessel. By way of example, if methane or ethane is used, the hydrogen partial pressure has to be greater by approx. a factor of 2 than that of the hydrocarbon. Otherwise, carbon is deposited in the lamp vessel. Since the concentrations of carbon and hydrogen required generally have to be in the range of up to few percent, the high hydrogen content has an adverse effect on the efficiency of the lamp.

To reduce the loss in efficiency, in addition to the hydrogen halogens have also been used to react with the carbon, cf. for example U.S. Pat. No. 3,022,438. The carbon which evaporates from the luminous body reacts in the cold regions near to the bulb wall with chlorine atoms, for example, to form compounds such as $CCl_4$, thereby preventing the carbon from being deposited on the wall. The carbon-halogen compounds are transported back toward the incandescent body through transport processes, such as convection and diffusion and decompose again in the warmer region so as to release the carbon. The carbon can be accumulated again on the filament. To prevent carbon from being deposited by means of halogen and hydrogen, according to U.S. Pat. No. 3,022,438 both the total quantity of the halogen element introduced into the lamp and the quantity of the element hydrogen must in each case be greater than the total quantity of carbon present in the gas phase. Since the carbon-chlorine and carbon-bromine compounds can only form at temperatures around or below approx. 150° C., the use of the carbon-halogen cycle process is restricted to lamps with a relatively large bulb volume and therefore bulb temperatures of around or below 200° C. The carbon-halogen cycle process based on chlorine or bromine certainly no longer works at temperatures of at least 200° C. and correspondingly small dimensions of the bulb.

The only exception is formed by carbon-fluorine compounds. However, these systems require additional protective measures for the glass bulb and are therefore not considered further at this point. A carbon-iodine cycle process cannot be realized. This is based on the instability of the carbon-iodine compounds $CI_x$. Therefore, the range of applications of U.S. Pat. No. 3,022,438 is restricted to the halogens fluorine, chlorine and bromine.

Since the tantalum carbide luminous bodies have preferably been operated in relatively large bulbs (the typical diameter of the bulbs of general use lamps is in the range between 30 mm and 140 mm), with the lamps described in the literature it was possible to accept a moderate deposition of solids, such as carbon or also tantalum (cf. below), because the blackening was distributed over a large area of the inner wall of the bulb.

SUMMARY OF THE INVENTION

It is an object of the present invention to provide an incandescent lamp with halogen cycle process in accordance with the preamble of claim 1 which allows a long service life. A further object is to provide an incandescent lamp which operates practically without any blackening, specifically, for preference, even with a small bulb volume. A further object is to provide an incandescent lamp having a high-melting luminous body, the material of which allows a higher luminous density than if tungsten is used.

These objects are achieved by the characterizing features of claim 1. Particularly advantageous configurations are given in the dependent claims.

According to the invention, a double cycle process is used for this purpose. On the one hand, a carbon-hydrogen cycle process is used in order to avoid decarburization of the high-melting luminous body formed from metal carbide, in particular from TaC. However, HfC or NbC or ZrC or alloys of various carbides with an excess of C are also suitable. In addition, for the first time a suitably adapted metal-halogen cycle process, in particular a tantalum-halogen cycle process, is superimposed. This avoids both blackening of the bulb by carbon and blackening of the bulb by the metal, in particular tantalum.

The invention described here relates to lamps with a reduced bulb volume, in which the distance between the luminous body, in particular its illuminating sections, and the inner wall of the bulb is at most 18 mm. In particular, the bulb diameter is at most 35 mm, in particular in the range between 5 mm and 25 mm, preferably in the range between 8 mm and 15 mm. In the case of bulbs with such small dimensions, in particular such a small diameter, the risks of solids being deposited on the bulb wall must be avoided at all costs. Since with such small bulb diameters the bulb wall temperature is generally well over 200° C., it is no longer suitable to use conventional carbon-halogen cycle processes.

The composition of the gas phase using tantalum carbide at high temperatures was experimentally investigated, by way of example, by J. A. Coffmann, G. M. Kibler, T. R. Riethof, A. A. Watts: WADD-TR-60-646 Part 1 (1960). This surprisingly showed that with prolonged heating times at relatively high temperatures, in addition to carbon considerable quantities of tantalum are also present in the gas phase, contrary to thermodynamic expectation. This is probably attributable to kinetic effects. At high temperatures over approx. 3000 K, the carbon which has been evaporated outward from the luminous body cannot be replaced quickly enough by carbon which continues to diffuse from the interior of the luminous body. Even if the evaporation of carbon can be at least slowed by a suitable, generally known carbon cycle process, at high temperatures well above approx. 3000 K there are still likely to be considerable quantities of tantalum in the gas phase. If the bulb is of relatively small dimensions, in particular with a diameter of at most 35 mm, this tantalum is deposited on the bulb wall unless further measures are taken.

Now, it is in principle possible to realize halogen cycle processes—in a similar way to for lamps with tungsten incandescent bodies—also for lamps whose incandescent bodies consist of the elements Ta, Hf, Zr, Os, Ti, Nb, Th, Mo and/or contain these elements among others, since the suitable chemical reaction systems described in the introduction are present. However, hitherto no attention has been paid to this phenomenon, since firstly it was believed that in the case of luminous bodies made from metal carbides only the evaporation of the carbon would restrict the service life, and secondly theoretical calculations are normally based on inaccurate assumptions relating to the thermodynamic conditions in the case of lamps of small volume. However, these assumptions do not apply to small-volume lamps and/or lamps with a small diameter of the bulb. This is a crucial reason for the fact that attempts have been made in vain for some hundred years to create a carbide-containing lamp with a viable service life.

According to the invention, the use of two cycle processes is now proposed for the first time when using tantalum carbide luminous bodies or also other carbide-containing luminous bodies in lamps with a relatively small bulb diameter or bulb volume. In addition to the known carbon-hydrogen cycle process, a tantalum-halogen cycle process is also used to prevent the deposition of tantalum on the bulb wall.

The known carbon cycle process uses hydrogen to prevent the deposition of carbon on the bulb wall and returns the evaporated carbon to the luminous body. The carbon cycle process is effected by the addition of the elements carbon and hydrogen to the fill gas. This can be effected, as described in the literature, in the form of various compounds which deliver carbon and hydrogen as they decompose. By way of example, it is possible to use hydrocarbons, such as methane, ethane, ethene, etc, and further hydrogen may have to be added. The total proportion of carbon, present in the hydrocarbon mixtures, in the fill, at a cold filling pressure of 1 bar, is preferably in the range between 0.1 mol % of C and 5 mol % of C. The minimum content is preferably 0.25 mol %. The total level of hydrogen introduced should be at least equal to the level of carbon and should preferably be from two to eight times the level of carbon.

The metal cycle process which takes place at the same time will be explained in more detail on the basis of the example of tantalum. The tantalum cycle process is effected by the addition of a halogen. The tantalum which evaporates from the incandescent body at high temperatures reacts at the lower temperatures near to the bulb wall to form tantalum halides, which are more volatile than tantalum. This prevents the deposition of tantalum on the bulb wall. After the tantalum halides have been transported back toward the luminous body through convection or diffusion and have decomposed at higher temperatures, the tantalum is accumulated again on the luminous body. The extent to which the two cycle processes interfere with one another and the range in which the bulb wall temperatures need to be generally depend on the halogen used. In any event, one characteristic feature is that the halogen content required here, which according to the invention is required primarily for the tantalum cycle process and not for the carbon cycle process, is lower, in particular by a factor of 2, preferably a factor of 5 to 10, than the carbon content required for the carbon cycle process.

The deliberate addition of oxygen or compounds which deliver oxygen as they decompose is not necessary for the tantalum cycle process or is even harmful to the tantalum carbide luminous body. At high temperatures, oxygen decomposes tantalum carbide to form carbon monoxide and the brittle subcarbide $Ta_2C$. Therefore, it should be ensured that oxygen is excluded, as has already been described, for example, in U.S. Pat. No. 3,022,438.

Suitable active halogens are in particular bromine and chlorine, at a minimum temperature of 150° C., preferably at least 200° C. It is also possible to use iodine, but in this case the range of possible bulb temperatures is restricted.

If bromine is used as active halogen, primarily higher bromides, such as $TaBr_5$ are the compounds which support the cycle process. These compounds are so stable that they are scarcely reduced even by hydrogen for virtually the entire range of bulb temperatures which is of relevance. Only with very small bulb dimensions corresponding to high bulb temperatures of over approx. 700° C. may conditions change. Therefore, in this case the carbon-hydrogen cycle process normally has no effect on the tantalum-halogen cycle process, since the elements carbon and hydrogen which support the carbon-hydrogen cycle process do not form compounds with tantalum in the gas phase. For a typical cold filling pressure of 1 bar, the total concentration of the element bromine introduced into the gas phase is preferably between 500 ppm and 5000 ppm. The halogen may be admixed with the filling gas in the form of additives, such as $CH_2Br_2$, $CH_3Br$, $CHBr_3$, etc. The bulb wall temperature should be no lower than approx. 150° C. The hydrogen excess means that the bulb wall temperature must not be too high; it is preferably below approx. 700° C. The quantities of carbon and hydrogen introduced into the lamp atmosphere via these additives enter into the total balance for the elements under consideration. However, these quantities are generally significantly smaller than the quantities introduced via the carbon/hydrogen mixture.

If chlorine and also iodine are used as active halogens, the same qualitative considerations apply. The preferred concentrations for the total amount of halogen introduced into the gas phase are in the same range. The range of preferred bulb wall temperatures when using iodine as active halogen is in the range between 150° C. and 600° C. and when using chlorine is in the range between 150° C. and 900° C., i.e. the use of chlorine as active halogen is preferred for use in lamps which are subject to high loads. Chlorine may be added, for example, in the form of $CH_3Cl$, $CH_2Cl_2$, $CHCl_3$, and iodine may preferably be added in the form of $CH_3I$ or $C_2H_5I$.

Whereas the tantalum-halogen cycle process is not influenced or is only slightly influenced by the carbon-hydrogen cycle process for the majority of relevant bulb temperatures, the carbon-hydrogen cycle process may be greatly affected by the tantalum-halogen cycle process. The halogen combines at low temperatures to form very stable halogen-hydrogen compounds, with the result that the hydrogen which is bonded as a result is then scarcely still available for reaction with carbon. This applies in particular to chlorine and bromine but also to a lesser extent to iodine, cf. below. Therefore, the total quantity of halogen element introduced into the lamp should be smaller by at least a factor of 2 than the total quantity of hydrogen which is present in the lamp, at least when using chlorine and bromine. This does not generally present a problem, since only small quantities of halogen are required for a tantalum cycle process to function. When using the tantalum-halogen cycle process, therefore, the total quantity of the halogen which is present in the gas phase is significantly smaller, in particular by at least a factor of two, than the total quantity of carbon which is present in the gas phase. This teaching is contrary to the concentration ratios when using the carbon-halogen cycle process as described in U.S. Pat. No. 3,022,438 for lamps with a large volume. There, the quantity of halogen is greater than the total quantity of carbon in the gas phase.

For filling pressures other than 1 bar, the preferred concentration ranges can be determined by simple calculation observing the rule that the total number of particles introduced should be constant, i.e. the concentrations given change approximately inversely proportionally to the pressure. The higher the pressure, the more slowly the transport processes occur and the less relevant the hydrogen required for the cycle process becomes to the dissipation of heat, and consequently the efficiency of the lamps increases considerably as the pressure rises. Higher filling pressures of at least 3 bar, in particular 5 bar, therefore give good results with regard to the efficiency.

Since the hydrogen iodide HI is relatively unstable and readily decomposes even at relatively low temperatures, the use of HI as "hydrogen carrier" is recommended. Hydrogen iodide decomposes easily—even at the relatively low temperatures near to the bulb wall—and makes available the hydrogen bonded therein to the carbon in order to form hydrocarbons. The formation of $CH_4$ is typical. On the other hand, the bonding of free hydrogen—not required to form hydrocarbons—in the form of HI greatly reduces the dissipation of heat via the filling gas. This results in a considerable increase in the efficiency of the lamp. The use of iodine to bond free hydrogen is recommended in particular if a relatively small total pressure makes the dissipation of heat by hydrogen an important factor and the radiation adsorption of the $I_2$ which occurs in considerable concentrations in addition to the hydrogen iodide is not disruptive to the particular application. If appropriate, it may also be suitable to use two halogens, for example in highly loaded lamps, i.e. those with a particularly small volume and/or high wattage, chlorine or bromine may have to be used for the tantalum-halogen cycle process and iodine may be required to bond the free hydrogen.

The principle of superimposed cycle processes, namely a carbon-hydrogen cycle process and a metal-halogen cycle process—for example comprising the metal tantalum, rhenium, niobium, zirconium, hafnium—can also be applied to other luminous body materials; in particular hafnium carbide, zirconium carbide and alloys of tantalum carbide and other carbides, e.g. an alloy made up of 90% of tantalum carbide and 10% of tungsten carbide, as well as other alloys, for example those described in U.S. Pat. No. 3,405,328. It can also be applied to substrates coated with tantalum carbide or other high-melting carbides or the alloys described above, which substrates, by way of example, may consist of rhenium or rhenium alloys (U.S. Pat. No. 1,854,970) or carbon fibers.

The quantities of carbon, hydrogen and halogen are such that a cycle takes place both for carbon and for the metal, generally tantalum. Suitable inert gases are the noble gases He, Ar, Kr and/or xenon and nitrogen.

In one particular embodiment, a C—N cycle process or C—S cycle process is additionally superimposed on the C—H cycle process, as well as the tantalum-halogen cycle process. The use of the C—N cycle process as the only cycle process in TaC lamps is already known, cf. U.S. Pat. No. 2,928,977, with halogen in part also being used in order to avoid the formation of paracyanogen. On its own, the C—N cycle process preferably returns the carbon to locations which are at a higher temperature and therefore extends the service life. However, it has emerged that it alone evidently cannot avoid blackening of the bulb. To this extent, the combination of the two processes is to a certain extent be understood as a division of labor, since only the C—H cycle process reliably prevents the deposition of carbon on the bulb wall. By contrast, the C—N cycle process promotes the return to the luminous body.

The addition of a halogen returns the tantalum to the luminous body or avoids the formation of the paracyanogen.

To avoid having to add the highly toxic dicyanogen C2N2, it is preferably possible to use much less toxic compounds, such as acetonitrile CH3CN, which when they are thermally decomposed deliver not only the CN group but also the hydrocarbon.

Alternatively, the CN may also be produced only once the lamp has been completed, by plasma excitation of a filling gas mixture which contains, inter alia, nitrogen (as $N_2$) and hydrocarbons.

In the case of the C—S cycle process, it should be noted that normally when sulfur is added the tantalum carbide luminous body is damaged through the formation of carbon monosulfide CS, similarly to in the case of the reaction with oxygen through the formation of CO. However, if equimolar quantities of sulfur and carbon are added to the filling gas, at temperatures below 2000 K carbon disulfide $CS_2$ and carbon are formed, whereas CS is only formed at higher temperatures. Whereas the compound CS is scarcely dissociated at 3000 K, it is almost completely decomposed up to temperatures of over 4000 K. This behavior can be exploited to deliberately transport the carbon back into the hot regions of the luminous body. Whereas if hydrogen alone is used to bond the carbon large quantities of elemental carbon are released at temperatures as low as above 700 K, the additional use of sulfur makes it possible to keep the carbon largely bonded in molecules up to a temperature of 3500 K. Below 550 K, $CS_2$ tends to decompose into the elements, so that in addition to carbon and sulfur by way of example hydrogen can be added to the filling gas in order to prevent carbon and/or sulfur from being deposited on the bulb wall.

Overall, therefore, it is recommended to use a superimposed combination S—H and/or C—H cycle processes at lower temperatures with a C—S cycle process at higher temperatures. At lower temperatures close to the bulb wall, sulfur is held in the gas phase in particular in the form $H_2S$ and carbon is held in the gas phase in particular in the form of $CH_4$. On transition to higher temperatures, $H_2S$ and $CH_4$ decompose to form carbon disulfide $CS_2$, hydrogen $H_2$ and— but in a much lower concentration than in the system without sulfur—elemental carbon. As the temperature rises further, the carbon can once again be completely bonded in the form of CS which, as described, decomposes above 3000 K. In this respect, CS differs significantly from CO, which scarcely decomposes at all up to temperatures of almost 4000 K. Therefore, CS is significantly more suitable than C—H compounds—which decompose at temperatures well below 3000 K—and than CO—which only decomposes above 4000 K—for transporting the carbon back to a tantalum carbide luminous body which is preferably operated at temperatures between 3200 K and 3800 K. When designing the cycle process, it is advantageous that each carbon atom is provided with 4 hydrogen atoms to form $CH_4$ and each sulfur atom is provided with 2 hydrogen atoms to form $H_2S$; it is preferable to use slightly greater quantities of hydrogen. Furthermore, the quantity of carbon should be at least equal to the quantity of sulfur used or should preferably be even greater, in order to avoid an excess of sulfur, which damages the tantalum carbide luminous body, under all circumstances.

Sulfur may be added, for example, in the form of hydrogen sulfide $H_2S$, carbon disulfide $CS_2$, methyl mercaptan $CH_3SH$, ethyl mercaptan $C_2H_5SH$, or if appropriate also dimethyl sulfide $CH_3CSCH_3$. As described above, carbon and hydrogen may be added in the form of hydrocarbons, such as $CH_4$, $C_2H_4$, $C_2H_2$, etc., and if appropriate hydrogen $H_2$, such that the desired ratios of the individual elements are set.

The ratios of the individual elements should be selected in such a way that for a filling pressure of 1 bar, selected as standard here, the total quantity of the element carbon which is present is between 0.1 mol % and 5 mol %, and in particular is at least 0.25 mol %, the molar concentration of the element sulfur results from the molar concentration of the element carbon by multiplying by a factor of between 0.2 and 1;

the molar concentration of the element hydrogen is preferably at least equal to the sum of the molar concentration of the element carbon multiplied by four and the molar concentration of the element sulfur multiplied by 2; depending on the particular embodiment, the total molar concentration of the element hydrogen introduced may be between the minimum quantity indicated and the minimum quantity multiplied by a factor of 8.

It is preferable to use cold filling pressures which are higher than 1 bar. Pressures of up to 20 bar are possible. It is possible to convert the concentration details as described above, i.e. the absolute quantities of substance are approximately retained.

In this case, it is not always necessary to add halogens, since tantalum is bonded in the form of tantalum sulfides, i.e. the sulfur takes over the function of the tantalum-transporting element. On account of the return of carbon to the luminous body which is achieved in this case, also only a relatively small quantity of tantalum is evaporated, and if appropriate at the low bulb temperatures it is possible to accept the loss of small quantities of tantalum sulfide.

If it is necessary to use a relatively large excess of hydrogen, this can in turn—as described above—be bonded in cooler regions in the form of HI in order to avoid excessive dissipation of heat via the filling gas.

In special cases (low bulb temperatures below approx. 600 K) it is possible to use additions of carbon, sulfur and chlorine without the simultaneous presence of hydrogen. In this case, the deposition of carbon on the bulb wall is prevented by the formation of $CCl_4$ and sulfur is held in the gas phase, in particular in the form of $SCl_2$ or $S_2Cl_2$. Toward higher temperatures, the elements carbon and sulfur are released through dissociation of the abovementioned compounds, and as the temperature rises further the elements carbon and sulfur combine to form $CS_2$ or, at even higher temperatures, CS. As described above, CS decomposes at the high temperatures in the vicinity of the luminous body and carbon is returned to the luminous body. If tantalum is to be held in the gas phase in the form of tantalum halides, this requires so little halogen that the quantity goes almost unnoticed in the metering instructions. The addition of the required elements may take the form of the compounds $CCl_4$, $CS_2$, $SCl_2$, $S_2Cl_2$, $Cl_2$, $NCl_3$.

It has emerged that when using a fill which contains the elements carbon, hydrogen and sulfur in the concentrations described here, the sulfur can be partly replaced by oxygen. At most 75% of the sulfur used can be replaced by oxygen. The oxygen may, for example, be supplied in the form of $N_2O$, CO, $CO_2$, aldehydes, such as $CH_2O$, ketones, such as acetone $CH_3COCH_3$.

The present invention is particularly suitable for low-voltage lamps with a voltage of at most 50 V, since the luminous bodies required for such lamps can be of relatively solid design and therefore the wires have a diameter of at least 50 μm, in particular between 80 μm and 300 μm, which considerably reduces the problem of the brittleness of such luminous bodies based on carbide. The invention is particularly preferably used for lamps which are pinched on one side, since in this case the luminous body can be kept relatively short, which likewise reduces the susceptibility to fracture it. This now makes it possible to achieve service lives of at least 500 hours.

The realization of a lamp of this type is promoted still further by the fact that it has emerged that a Ta-halogen cycle is generally significantly less sensitive than a W-halogen cycle.

BRIEF DESCRIPTION OF THE DRAWINGS

The invention is to be explained in more detail below on the basis of a number of exemplary embodiments. In the drawing.

PREFERRED EMBODIMENT OF THE INVENTION

Figure 1:
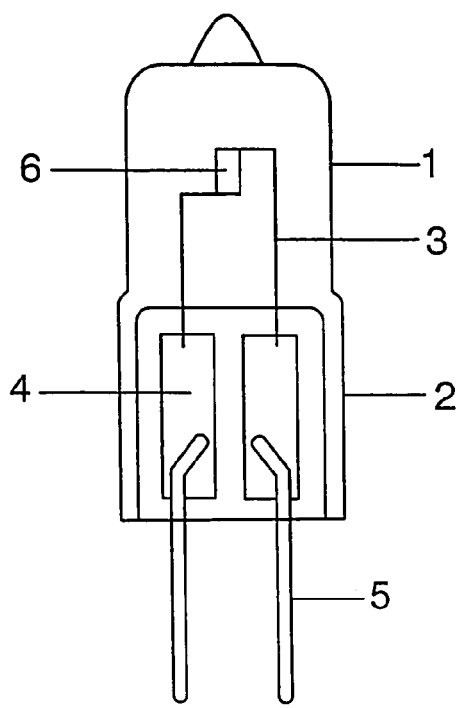
FIG. 1 shows a typical incandescent lamp with carbide luminous body.

FIG. 1 shows an incandescent lamp which is pinched on one side and has a bulb made from quartz glass 1, a pinch 2 and supply conductors 3 which connect foils 4 in the pinch 2 to a luminous body 6. The luminous body is a coiled wire made from TaC. The current feeds 5 are fitted to the outside of the foils. The internal diameter of the bulb is 5 mm.

Figure 2:
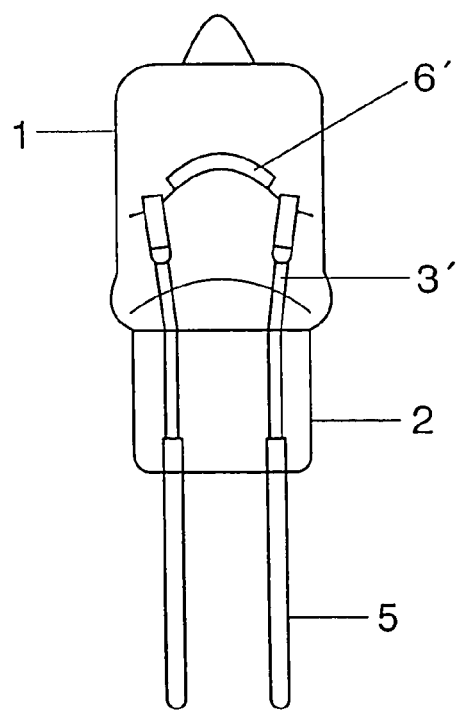
FIG. 2 shows a further typical incandescent lamp with carbide luminous body.

FIG. 2 shows an incandescent lamp which is pinched on one side and has a bulb made from hard glass 1, a pinch 2 and supply conductors 3' which are connected to a luminous body 6' in the pinch 2. The luminous body 6' is a coiled wire with a core of rhenium and a layer TaC at the surface. This luminous body is more readily deformable than a luminous body which consists purely of carbide. In this case, generally first of all the rhenium wire is wound, then a TaC layer is applied. The current feeds 5 are fitted directly to the supply conductors 3' on the outside, specifically in the region of the pinch. The internal diameter of the bulb is 30 mm. Alternatively, the luminous body is a strand of carbon fibers which are coated with tantalum. The TaC layer may be produced, for example, by the application of a tantalum layer by means of a CVD process or by sputtering, followed by carburization. The carburization of the Ta layer may also be carried out only when the lamp is operated in a hydrocarbon-containing atmosphere.

Figure 3:
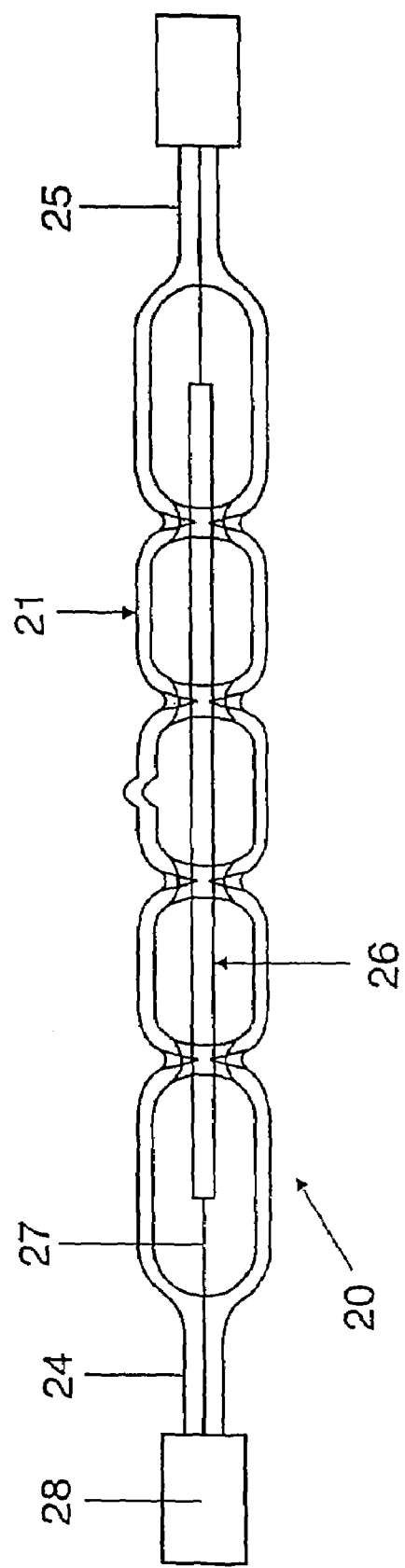
FIG. 3 shows a further typical incandescent lamp with carbide luminous body.

FIG. 3 shows an incandescent lamp 20 which is pinched on two sides, also known as a double-ended lamp, with a bulb made from quartz glass 21, two pinches 24 and 25, supply conductors 27, which are connected to a luminous body 26. The luminous body 26 is a ribbon of TaC. The current feeds 25 end in cap parts 28, as known per se, which are seated on the pinch. The internal diameter of the bulb is 15 mm.

In general, the lamp preferably uses a luminous body made from tantalum carbide, which preferably comprises a coiled wire or a ribbon.

The bulb is made from quartz glass or hard glass with a bulb diameter between 5 mm and 35 mm, preferably between 8 mm and 15 mm.

The filling is primarily inert gas, in particular noble gas, such as Ar, Kr or Xe, if appropriate with the addition of small quantities (up to 15 mol %) of nitrogen. In addition, it contains a hydrocarbon, hydrogen and a halogen additive.

Zirconium carbide, hafnium carbide or an alloy of various carbides, as described, for example, in U.S. Pat. No. 3,405,328, are also suitable as luminous body material, which is preferably a coiled wire.

An alternative is a luminous body which consists of a substrate material, such as rhenium wire, for example, as core or also a carbon fiber, this core being coated with tantalum carbide or another metal carbide.

Basic rules for the filling at a cold filling pressure of 1 bar are a carbon level of from 0.1 to 5 mol %. The level of hydrogen is at least equal to the level of carbon and is preferably from 2 to 8 times the level of carbon. The level of halogen is at most half, in particular from one fifth to one twentieth, of the level of carbon. A minimum value of one tenth is preferred, with iodine being used to bond the hydrogen. The level of halogen should preferably correspond to at most the level of hydrogen, preferably at most half the level of hydrogen. A guideline value for the level of hydrogen is from 500 to 5000 ppm, always based on a cold filling pressure of 1 bar.

If the bulb dimensions are selected to be such that the bulb wall temperature is between 100° C. and 700° C., the following additive could be admixed with the inert gas, generally a noble gas, which if appropriate may also contain additions of nitrogen:

a hydrocarbon, preferably $CH_4$, $C_2H_6$, $C_2H_4$, $C_2H_2$;
hydrogen ($H_2$);
and hydrogen bromide or a brominated hydrocarbon (preferably $CH_2Br_2$, $CHBr_3$ or $CH_3Br$), so that the following total contents are preferably present in the gas phase at a cold filling pressure of 1 bar:

carbon 0.1%-5% (preferably at least 0.25 mol %), hydrogen 0.2%-20% (preferably at least 0.5 mol %), bromine 0.05%-0.5%.

If the bulb dimensions are selected in such a way that the bulb wall temperature is between 150° C. and 900° C., the following additive may be admixed with the inert gas, generally noble gas, which if appropriate may also contain additions of nitrogen:

a hydrocarbon (preferably $CH_4$, $C_2H_6$, $C_2H_4$, $C_2H_2$);
hydrogen ($H_2$);
hydrogen chloride or a chlorinated hydrocarbon (preferably $CH_2Cl_2$, $CHCl_3$ or $CH_3Cl$)

so that the following total contents are preferably present in the gas phase at a cold filling pressure of 1 bar:

carbon 0.1%-5% (preferably at least 0.25 mol %), hydrogen 0.2%-20% (preferably at least 0.5 mol %), chlorine 0.05%-0.5%.

If the bulb dimensions are selected in such a way that the bulb wall temperature is between 150° C. and 600° C., the following additive may be admixed with the inert gas, generally noble gas, which if appropriate may also contain additions of nitrogen:

a hydrocarbon (preferably $CH_4$, $C_2H_6$, $C_2H_4$, $CH_2$);
hydrogen ($H_2$);
and iodine, hydrogen iodide or an iodinated hydrocarbon (preferably $CH_3I$);

so that the following total contents are preferably present in the gas phase at a cold filling pressure of 1 bar:

carbon 0.1%-5% (preferably at least 0.25 mol %), hydrogen 0.2%-20% (preferably at least 0.5 mol %), iodine 0.05%-0.5%.

In general, it is proven advantageous for the total quantity of halogen introduced into the lamp to be lower than that of the hydrogen. It is preferable for the total quantity of halogen introduced into the lamp to be lower by a factor of from 5 to 25 than the total quantity of hydrogen introduced.

If the bulb dimensions are selected in such a way that the bulb wall temperature is between 150° C. and 600° C., it is alternatively possible for the following additive to be admixed with the inert gas (a noble gas which if appropriate also contains additions of nitrogen):

a hydrocarbon (preferably $CH_4$, $C_2H_6$, $C_2H_4$, $C_2H_2$);
hydrogen ($H_2$);
and iodine, hydrogen iodide or an iodinated hydrocarbon (preferably $CH_3I$, $C_2H_5I$);

so that the following total contents are preferably present in the gas phase at a cold filling pressure of 1 bar:

carbon 0.1%-5% (preferably at least 0.25 mol %), hydrogen 0.2%-20% (preferably at least 0.5 mol %), iodine 0.1%-20% (preferably at least 0.2%), with the iodine content and the hydrogen content being approximately equal; in this case, the iodine serves to avoid excessively high concentrations of free hydrogen, i.e. to increase the efficiency of the lamp.

If the bulb dimensions are selected in such a way that the bulb wall temperature is between 150° C. and 900° C., it is alternatively possible for the following additive to be admixed with the inert gas (a noble gas which if appropriate also contains additions of nitrogen):

hydrocarbon (preferably $CH_4$, $C_2H_6$, $C_2H_4$, $C_2H_2$);
hydrogen ($H_2$);
hydrogen chloride or a chlorinated hydrocarbon (preferably $CH_2Cl_2$, $CHCl_3$ or $CH_3Cl$),
and iodine, hydrogen iodide or a halogenated hydrocarbon (preferably $CH_3I$; $C_2H_5I$);

so that the following total contents are preferably present in the gas phase at a cold filling pressure of 1 bar:

carbon 0.1%-5% (preferably at least 0.25 mol %), hydrogen 0.2%-20% (preferably at least 0.5 mol %), chlorine 0.05%-0.5%, iodine 0.1%-20%, with the iodine content and the hydrogen content being approximately equal.

If the bulb dimensions are selected in such a way that the bulb wall temperature is between 150° C. and 700° C., it is alternatively also possible for the following additive to be admixed with the inert gas (a noble gas which if appropriate also contains additions of nitrogen):

hydrocarbon (preferably $CH_4$, $C_2H_6$, $C_2H_4$, $C_2H_2$);
hydrogen ($H_2$);
hydrogen bromide or a brominated hydrocarbon (preferably $CH_2Br_2$, $CHBr_3$ or $CH_3Br$),
and iodine, hydrogen iodide or an iodinated hydrocarbon (preferably $CH_3I$, $C_2H_5I$);

so that the following total contents are preferably present in the gas phase at a cold filling pressure of 1 bar:

carbon 0.1%-5% (preferably at least 0.25 mol %), hydrogen 0.2%-20% (preferably at least 0.5 mol %), bromine 0.05%-0.5%, iodine 0.1%-20%, with the iodine content and the hydrogen content being approximately equal, in particular equal to an accuracy of within a factor of two.

If a cyanogen cycle process is superimposed with a carbon-hydrogen cycle process and a halogen cycle process, the fill additionally also contains from 0.3 mol % to 3 mol % of cyanogens (which may have been introduced into the fill in any desired way).

For a lamp with a bulb diameter of 10 mm and a luminous body made from TaC, a very specific fill consists of the following components: 1 bar (cold filling pressure) Kr+1% of $C_2H_4$+1% of $H_2$+0.05 to 0.3% of $CH_2Br_2$ (the concentrations are given in mol %). In particular the addition of 0.2% of $CH_2Br_2$ gives the best performance.

The invention claimed is:

1. An incandescent lamp comprising:
a light transmissive bulb having a wall defining an enclosed volume sealed in a vacuum-tight manner;
a luminous body positioned in the enclosed volume; the luminous body including a metal carbide having a melting point greater than the melting point of tungsten, the least distance between the luminous body and the wall being less than 18 mm;
electrical leads sealed through the wall and electrically coupled to the luminous body;
a filing enclosed in the enclosed volume including:
an inert fill gas; and
one or more additives composed of carbon, hydrogen and halogens, so that the total content in the gas phase, based on a cold filling pressure of 1 bar, in mol percent is:
carbon 0.1%-5.0%,
hydrogen 0.2%-20.0%,
halogen, not including fluorine 0.05%-0.5%;
and no nitrogen;
whereby a first cycle process is supported attributed to the carbon, and a second cycle process is supported which is attributed to the metal and halogen.

2. The incandescent lamp in claim 1, wherein the luminous body consists of one or more metal carbides or an alloy of metal carbides.

3. The incandescent lamp in claim 1, wherein the luminous body comprises a core of a first material and a coating of a second material being a metal carbide formed on the surface of the core.

4. The incandescent lamp in claim 3, wherein the core comprises one or more carbon fibers.

5. The incandescent lamp in claim 1, wherein the fill includes a hydrocarbon including at least one of CH4, C2H6, C2H4, and C2H2.

6. The incandescent lamp in claim 1, wherein the fill includes a halogenated hydrocarbon including at least one of CH2Cl2, CHCl3, CH3Cl, CH3I, C2H5I, CH3I, C2H5I, CH2Br2, CHBr3, and CH3Br.

7. The incandescent lamp in claim 1, wherein the total quantity of halogen introduced into the lamp is less than that of the hydrogen.

8. The incandescent lamp in claim 1, wherein the halogen is iodine and in mol percent, (iodine)/2<hydrogen<2*(iodine).

9. The incandescent lamp in claim 1, wherein the fill further includes in the gas phase from 0.3 mol percent to 3.0 mol percent of a compound carbon and sulfur.

10. The incandescent lamp in claim 1, wherein the fill includes:
carbon 0.25%-5.0%,
sulfur 0.05%-5.0%, and
hydrogen 0.5%-40.0%.

11. The incandescent lamp in claim 10, wherein the sulfur and carbon molar concentration relation is such that in mol percent:
(sulfur)<carbon and carbon<10*(sulfur).

12. The incandescent lamp in claim 11, wherein the hydrogen, sulfur and carbon molar concentration relations are further such that in mol percent:
4*(carbon)+2*(sulfur)<(hydrogen)<8*(4*(carbon)+2*(sulfur)).

13. The incandescent lamp in claim 12, wherein the fill includes iodine having a molar concentration that is between 0.1% and 15.0% and is less than the molar concentration of the hydrogen.

14. An incandescent lamp comprising:
a light transmissive bulb having a wall defining an enclosed volume sealed in a vacuum-tight manner;
a luminous body positioned in the enclosed volume; the luminous body including a metal carbide having a melting point greater than the melting point of tungsten, the least between the luminous body and the wall being less than 18 mm;
electrical leads sealed through the wall and electrically coupled to the luminous body;
a filing enclosed in the enclosed volume including:
an inert fill gas; and further one or more additives composed of carbon, hydrogen and halogens, so that the total content in the gas phase, based on a cold filling pressure of 1 bar, in mol percent is:
carbon 0.25%-5.0%,
sulfur 0.05%-5.0%,
hydrogen 0.5%-40.0%,
halogen, not including fluorine of 0.02%-0.5% or iodine of 0.02%-40.0%,
and no nitrogen;
whereby a first cycle process is supported attributed to the carbon, and a second cycle process is supported which is attributed to the metal and halogen.

15. The incandescent lamp in claim 14, wherein the fill, in the gas phase, based on a cold filling pressure of 1 bar, is in mol percent:
carbon 0.1%-5.0%,
sulfur 0.02%-5.0%, and
chlorine 0.42%-30.0%.

16. The incandescent lamp in claim 1, wherein the halogen is bromine.

17. The incandescent lamp in claim 1, wherein the halogen is chlorine.

18. The incandescent lamp in claim 1, wherein the halogen is iodine.

* * * * *